(12) United States Patent
Zhang et al.

(10) Patent No.: US 8,873,958 B2
(45) Date of Patent: Oct. 28, 2014

(54) SLEEP CONTROL FOR ENERGY EFFICIENCY IN ETHERNET PASSIVE OPTICAL NETWORKS

(71) Applicant: NEC Laboratories America, Inc., Princeton, NJ (US)

(72) Inventors: Jingjing Zhang, San Jose, CA (US); Ting Wang, West Windsor, NJ (US); Naoto Maeda, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 112 days.

(21) Appl. No.: 13/628,320

(22) Filed: Sep. 27, 2012

(65) Prior Publication Data

US 2013/0077972 A1 Mar. 28, 2013

Related U.S. Application Data

(60) Provisional application No. 61/539,529, filed on Sep. 27, 2011.

(51) Int. Cl.
*H04J 14/02* (2006.01)
*H04Q 11/00* (2006.01)
*H04L 12/12* (2006.01)

(52) U.S. Cl.
CPC ............. *H04L 12/12* (2013.01); *Y02B 60/35* (2013.01); *H04Q 2011/0079* (2013.01); *Y02B 60/34* (2013.01); *H04Q 11/0067* (2013.01)
USPC .......................................................... 398/67

(58) Field of Classification Search
CPC ... H04J 14/0267; H04J 3/0602; H04J 3/1682; H04Q 11/0067
See application file for complete search history.

(56) References Cited

U.S. PATENT DOCUMENTS

| | | | |
|---|---|---|---|
| 2003/0091045 A1* | 5/2003 | Choi et al. | 370/390 |
| 2012/0166819 A1* | 6/2012 | Skubic et al. | 713/300 |
| 2012/0263469 A1* | 10/2012 | Zhang et al. | 398/66 |

* cited by examiner

*Primary Examiner* — Nathan Curs
(74) *Attorney, Agent, or Firm* — Joseph Kolodka

(57) ABSTRACT

A method sets certain downstream traffic scheduling rules at an optical line terminal OLT and certain sleep control rules at optical network units ONUs. Both downstream traffic scheduling rules and sleep control rules are common information owned by both the OLT and ONUs. The method sets the traffic scheduling rules that each ONU is allocated with some time slots every cycle if the ONU has downstream traffic. Rather than using a control message to notify ONUs with their queue status, the method lets ONUs infer whether its downstream queue is empty or not based on downstream traffic scheduling and lets the OLT infer the status of an ONU based on sleep control rules.

6 Claims, 3 Drawing Sheets

(a). Energy saving and delay vs. arrival traffic rate (b). Energy saving and delay vs. x (c). Energy saving and delay vs. y

SLEEP CONTROL FOR ENERGY EFFICIENCY IN ETHERNET PASSIVE OPTICAL NETWORKS

RELATED APPLICATION INFORMATION

This application claims priority to provisional application No. 61/539,529 filed Sep. 27, 2011, the contents thereof are incorporated herein by reference.

BACKGROUND OF THE INVENTION

The present invention relates generally to optical communications, and more particularly, to sleep control for energy efficiency in Ethernet passive optical networks.

Owing to the near approach of optical fibers to the users and the passive nature of the remote node, passive optical networks (PONs) consume the smallest energy per transmission bit among various access technologies including WiMAX, FTTN, and point to point optical access networks. Nevertheless, it is still desirable to further reduce energy consumption of PONs since every single watt saving will end up with overall terawatt and even larger power saving as PON is deployed worldwide. Reducing energy consumption of PONs becomes even more imperative for 10G EPON system which provides ten times of the data rate of 1G EPON system owing to the fact that large data rate provisioning requires high power consumption of both the optical and electrical components of the device.

Since traffic of optical network units (ONUs) is rather bursty and changes dynamically, putting ONUs into sleep mode when the ONU does not have downstream or upstream traffic can save a significant amount of ONU energy. Ideally, it is desirable that an ONU stay in sleep mode with low power consumption when the ONU does not have traffic, and switch back into the active mode when traffic of an ONU arrives. However, the broadcast nature of the EPON downstream transmission disallows an ONU entering into the sleep mode. As shown in FIG. 1, the downstream data traffic of EPON ONUs is TDM multiplexed onto a single wavelength, and broadcasted to all ONUs. An ONU has to receive and check all downstream packets, and then decide whether the packets are destined to itself. Since all incoming downstream packets have to be checked, an ONU needs to stay awake all the time to avoid missing its downstream traffic.

A number of schemes have been proposed to address the downstream challenge so as to reduce the energy consumption of ONUs. These proposed energy saving schemes can be divided into two major classes. The first class tries to design proper MAC control scheme to covey downstream queue status to ONUs, while the second class focuses on investigating energy-efficient traffic scheduling schemes. Examples of schemes of the first class are the two-way or three-way handshake processes performed between optical line terminal OLT and ONUs. Typically, an OLT sends a control message notifying an ONU that its downstream queue is empty; the ONU optionally enters into the sleep mode and then sends a sleep acknowledgement or negative acknowledgement message back to OLT. While an OLT is aware of the sleep status of ONUs, it can buffer the downstream arrival traffic until the sleeping ONU wakes up.

However, to implement the handshake process, EPON MACprotocol, i.e., multipoint control protocol (MPCP) defined in IEEE 802.3ah or IEEE 802.3av, needs to be extended to introduce new MPCP protocol data units (PDUs). In addition, the negotiation process takes at least several round trip times, which implies that an ONU has to wait for several round trip times before entering into the sleep status after it infers that its downstream queue is empty. This may significantly impair the energy saving efficiency.

Energy saving schemes of the second class tackle the downstream challenge by designing suitable downstream bandwidth allocation schemes. Formerly, it was proposed by others to implement fixed bandwidth allocation (FBA) in the downstream when the network is lightly loaded. By using FBA, the time slots allocated to each ONU in each cycle are fixed and known to the ONU. Thus, ONUs can go to sleep during the time slots allocated to other ONUs. However, since traffic of an ONU dynamically changes from cycle to cycle, FBA may result in bandwidth under- or over-allocation, and consequently degrade services of ONUs in some degree. Another prior work proposed to schedule the downstream traffic and the upstream traffic simultaneously. An ONU stays in awake status during the upstream time slots allocated to it and switches into sleep status in other time slots. Since the downstream traffic of an ONU is sent over the time slots that its upstream traffic is sent, the ONU stays in awake status during that time period and will not miss its downstream packets. This scheme works well when traffic in the upstream and downstream are symmetric. Yet, it may cause inefficient bandwidth utilization when the downstream traffic outweighs upstream traffic.

Accordingly, there is a need for sleep control for energy efficiency in Ethernet passive optical networks.

BRIEF SUMMARY OF THE INVENTION

The present invention is directed a method for controlling downstream scheduling in an Ethernet passive optical network EPON that includes setting downstream traffic scheduling rules at an optical line terminal OLT, letting the rules be known by optical network units ONUs, an ONU owning information of the downstream traffic scheduling rules enabling the ONU capable of inferring its current downstream queue status based on historical arrival downstream traffic, according to the inferred queue status, the ONUs making their own sleep decisions based on selective sleep control rules, the sleep control rules being implemented at the ONU side being known by the OLT; and based on the sleep control rules, the OLT inferring a status of the ONUs, and buffering incoming downstream traffic of sleep ONUs responsively.

These and other advantages of the invention will be apparent to those of ordinary skill in the art by reference to the following detailed description and the accompanying drawings.

DETAILED DESCRIPTION

The present invention is directed addressing the downstream challenge with a sleep control method which can efficiently put an ONU receiver into sleep. The inventive method includes downstream traffic scheduling rules at an OLT and sleep control at ONUs. By letting ONUs be aware of the downstream traffic scheduling rules, ONUs infer their own downstream queue status and switch into sleep status properly and by letting the OLT know the sleep control scheme implemented at the ONUs, the OLT accurately infers the sleep status of ONUs and buffer traffic of sleep ONUs accordingly. Thus, sleep mode of ONU receivers can be efficiently enabled without extending the standardized EPON MAC protocol.

Applicants also analyze the impacts of different parameters in the sleep control scheme on the delay and energy saving performances by using semi-Markov chains. These analyses can help determine the optimal parameter settings in the sleep control algorithm.

This invention is directed at addressing the downstream challenge only. The inventive method can be applied when transmitters and receivers can be independently put into sleep. Another application scenario is when the ONU has downstream traffic only, e.g., file downloading and broadcast TV application. The inventive method is also potentially able to be combined with the upstream traffic scheduling such that both receivers and transmitters can be put into the sleep mode simultaneously.

Figure 1:
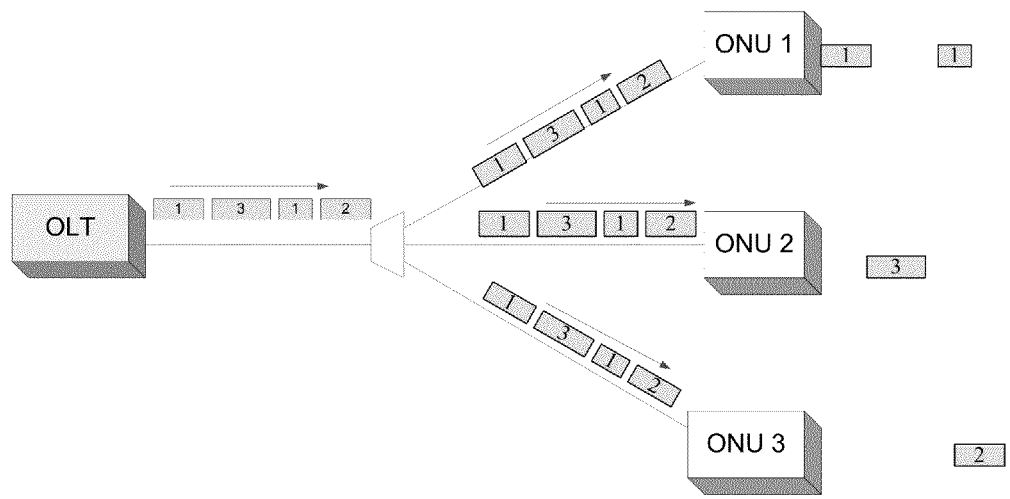
FIG. 1 shows an transmission in an Ethernet passive optical network EPON in which the invention can be employed.
Figure 2:
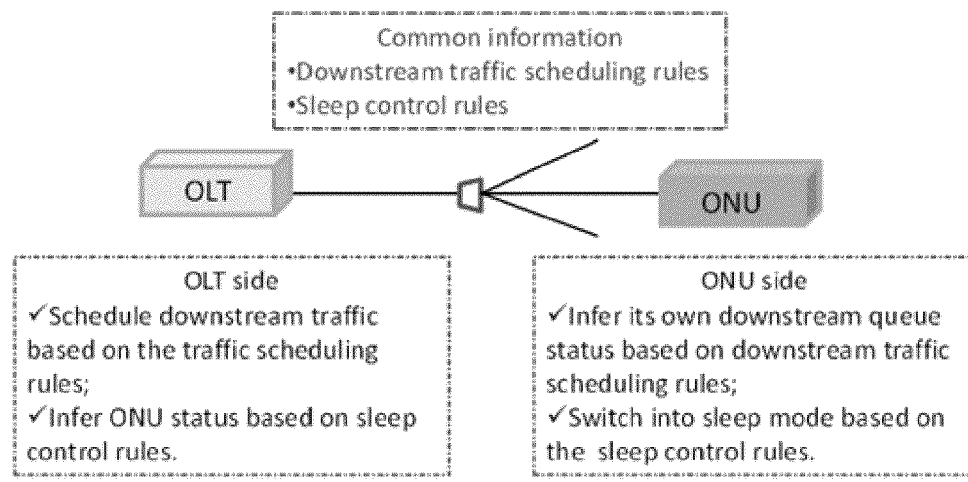
FIG. 2 is a diagram of sleep control in an EPON, in accordance with the invention.

The present invention can be generalized as follows. First, the method sets certain downstream traffic scheduling rules at OLT and lets the rules be known by ONUs. Since an ONU owns the information of the downstream traffic scheduling rules, it can infer its current downstream queue status based on historical arrival downstream traffic. Second, according to the inferred queue status, ONUs make their own sleep decisions based on some sleep control rules. These sleep control rules implemented at the ONU side is also known by OLT. Third, based on the sleep control rules, OLT infers the status of ONUs, and buffers the incoming downstream traffic of sleep ONUs accordingly. FIG. 2 describes the overall scheme. Essentially, the downstream traffic scheduling rules, the downstream queue inference at ONUs, the sleep control rules, and the ONU sleep status inference at OLT constitute four key components of the inventive sleep control method.

A. Downstream Traffic Schedule

Traffic scheduling in both downstream and upstream are not specified in EPON standard IEEE 802.3ah and IEEE 802.3av. Upstream bandwidth allocation has received extensive research attention in the past years. For the upstream scheduling, efficient upstream bandwidth utilization requires OLT allocate the bandwidth based on queue reports from ONUs.

The time gap between the traffic report and the bandwidth grant process may incur inefficient utilization of upstream bandwidth. Best utilizing the time gap for high network resource utilization has been one of the objective in designing bandwidth allocation algorithms for the upstream. Different from the upstream transmission, the downstream transmission does not have the queue report and bandwidth grant process since downstream traffic are queued at OLT who also makes the downstream traffic scheduling decision. Thus, in designing of the downstream traffic scheduling rules, our main objective is to facilitate ONUs infer their own downstream traffic status, rather than maximizing the bandwidth utilization. Below lists the designed downstream traffic scheduling rules.

Rule 1: Define the time duration of 2 ms as the downstream traffic scheduling cycle.
Rule 2: In a scheduling cycle, each ONU is allocated with some time durations if it has downstream traffic. Note that ONUs do not have to be allocated with continuous time durations within a scheduling cycle.
Rule 3: If OLT infers that an ONU is sleeping, it queues the arrival downstream traffic of the ONU until the ONU wakes up.

The reason for setting the scheduling cycle as 2 ms is to guarantee delay and jitter performances of delay-sensitive applications such as voice and video. The purpose of setting Rule 2 is to help an ONU infer its downstream queue status. Besides, this rule also helps prevent ONU from being starved and thus ensures fairness. Rule 3 is to avoid sleep ONUs missing their downstream packets.

B. Downstream Traffic Inference at ONU

According to the downstream traffic scheduling rules, if an ONU failed to receive any downstream data traffic within an EPON traffic scheduling cycle, the ONU can infer that its downstream queue is empty. Thus, rather than being explicitly notified by OLT about its downstream queue status, an ONU can infer its downstream queue status simply by monitoring the downstream bandwidth allocated among ONUs.

C. Sleep Control Rules

After being aware that its downstream queue is empty, an ONU can choose to enter into sleep mode. We design the following sleep control rules.

"If an ONU does not receive downstream data traffic for x traffic scheduling cycles, it switches into the sleep state, and sleep for y traffic scheduling cycles."

x traffic scheduling cycles are referred to as listening cycles, and y traffic scheduling cycles are referred to as sleeping cycles. Both x and y are known to OLT such that OLT can infer the sleep status of ONUs.

Figure 3:
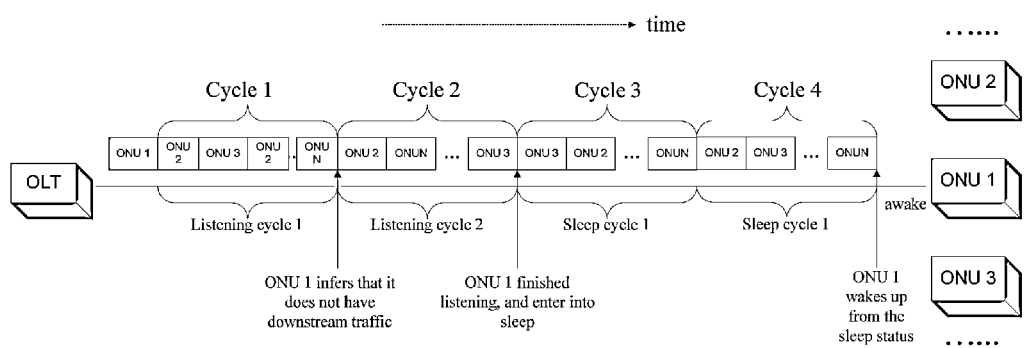
FIG. 3 shows a diagram of sleep control at an optical network unit ONU, in accordance with the invention.

FIG. 3 shows an example of the sleep control rules with x=2 and y=2. At the end of cycle 1, ONU 1 observes that it is not allocated with any time slots during the entire cycle of cycle 1. At that moment, ONU 1 infers that its downstream queue is empty. Since the number of listening cycles equals to 2, ONU 1 continues listening to the channel for one more cycle. At the end of cycle 2, ONU 1 still does not receive any downstream traffic. Then, it switches into sleep status and sleeps for two cycles since the number of sleeping cycles equals to 2. After cycle 4, ONU 1 wakes up from the sleep status.

D. ONU Status Inference and Traffic Scheduling at OLT

To avoid missing the downstream traffic when an ONU is sleeping, OLT should be aware of the sleep status of the ONU, and then buffer its incoming downstream traffic until the ONU wakes up. To enable the ONU status be accurately inferred by OLT, we let OLT own the information of the sleep control algorithm implemented at each ONU. Owing to the fact that an ONU makes its sleep decision based on the downstream bandwidth allocation profile which is also known to the OLT, the OLT can accurately infer the status of each ONU at any time. The ONU status inference can be described as follows.

"If OLT does not allocate any time slots to an ONU for x traffic scheduling cycles, the ONU will enter into sleep status in the next y traffic scheduling cycles."

After an OLT infers that an ONU is sleeping, it buffers the arrival downstream traffic of this ONU until the ONU wakes up from sleep.

With the above described steps, ONUs can switch into the sleep mode without extending the EPON control protocol. The listening time duration x cycles and the sleep time duration y cycles determine the energy saving efficiency and quality of service (QoS) performances. Proper setting x and y needs to consider the network traffic load, energy efficiency, as well as QoS of user sessions. In another work, applicants described an example in which x=1 and y exponentially increases with the time duration that an ONU's downstream queue keeps empty. In this invention, applicants focus on investigating the impact of x and y on network performances and energy efficiency under different traffic loads. Analytical results given below will provide insights on proper settings of x and y for different traffic loads.

Applicants employ semi-Markov chains to analyze the delay and energy saving performances of the sleep control method. For ease of analysis, applicants consider Poisson traffic arrival. It is assumed that the downlink packet arrival is a Poisson process of rate λ packets/s, and the packet arrival process is independent from the distribution of the packet size. The service rate of each packet is assumed to be exponentially distributed with mean value of μ. Regarding the transit time between sleep status and awake status, another's work has reduced it into tens of nanoseconds, which is negligible as compared to the duration of a traffic scheduling cycle. In this invention, the transit time is not considered.

ONU State and State Transitions

In the Markov chain model, each ONU has three possible sets of states, active states $\{\mathbb{A}(i)\}_{i=0}^{+\infty}$, listening states $\{\mathbb{L}(i)\}_{i=1}^{x}$, and sleeping state S.

A(i) refers to the state that an ONU has i queued downstream packets by the end of a traffic scheduling cycle. There is no upper bound of i.

L(i) refers to the state that an ONU does not have any downstream packets, and has not received any downstream data traffic for i traffic scheduling cycles. The listening time duration can be as large as x traffic scheduling cycles, where x is the number of listening cycles.

S refers to the status that the ONU stays in sleep. The sleep time duration equals to y traffic scheduling cycles, where y is the number of sleeping cycles.

Figure 4:
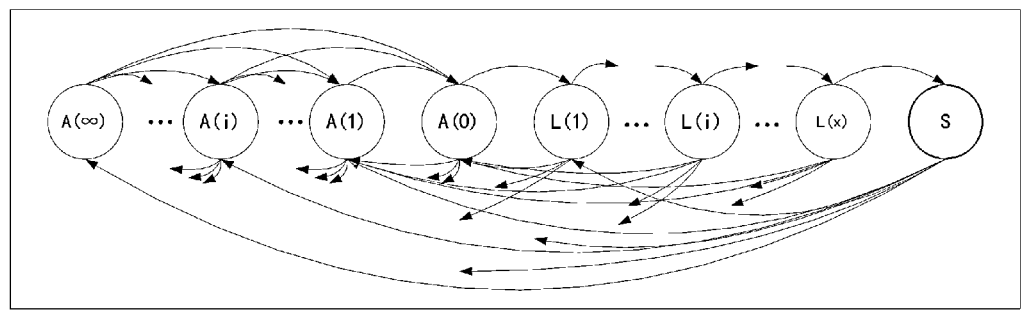
FIG. 4 depicts state transitions of an ONU, in an accordance with the invention.

FIG. 4 illustrates the state transitions. For a given ONU, assume the number of queued packets equals to a. If a>0, the ONU stays in state A(a). If a=0, the ONU could possibly stay in the active state A(0), listening states $\{\mathbb{L}(i)\}_{i=1}^{x}$ or the sleeping state S. During any traffic scheduling cycle, there may be i packets arrive and j packets depart for any ONU. There are three main cases of i and j.

If j is greater than i, then, the number of queued packets is increased by j−i at the end of the cycle;

If j is smaller than i, the number of queued packets is decreased to either a−(j−i) if a>j−i, or 0 otherwise.

If no packet arrives during a traffic scheduling cycle, i.e., i=0, the ONU state transits from A(0) to L(0) if the ONU stayed in state A(0) in the former cycle, from L(k) to L(k+1) if the ONU stayed in state L(k) in the former cycle, from L(x) to S if the ONU stayed in state L(x) in the former cycle.

Denote $p^a(\beta,\gamma)$ and $p^d(\beta,\gamma)$ as the probability that β downstream packets arrive at the OLT and depart from the OLT during γ traffic scheduling cycles, respectively. The probability that i packets arrive and j packets depart from the downstream queue equals to $p^a(j,\gamma) \, p^d(j,\gamma)$. Then, State transitions from A(0) to L(0), from L(k) to L(k+1), from L(x) to S happen when no packets arrive during the traffic scheduling cycle. The probabilities equal to $p^a(0,1)$.

State transitions from L(i) to A(k) occur when the number of arrival packets is greater than the number of departure packets by k during the traffic scheduling cycle. The probability equals to $\Sigma_{j=0}^{+\infty} p^a(k+j, 1) \cdot p^d(j, 1)$ State transitions from A(i) to A(i−k) happen when the number of arrival packets is smaller than the number of departure packets by k. The probabilities equal to $\Sigma_{j=0}^{+\infty} p^d(k+j, 1) \cdot p^a(j, 1)$ State transitions from S to A(i) happen when i packets arrive during y sleeping cycles. The probability equals to $p^a(i,y)$.

State transitions from S to L(1) occur when no packets arrive during y sleeping cycles. The probability equals to $p^a(0,y)$.

Based on the assumptions of Poisson arrival traffic, $p^a(\beta,\gamma)$ and $p^d(\beta,\gamma)$ can be obtained as follows.

$p^a(\beta,\gamma) = e^{-\lambda \cdot \gamma T} \cdot (\lambda \cdot \gamma T)^\beta / \beta!$ $p^d(\beta,\gamma) = e^{-\mu \cdot \gamma T} \cdot (\mu \cdot \gamma T)^\beta / \beta!$ With these state transition probabilities, the steady state probability of each state can be correspondingly derived.

Denote $P(\mathbb{S}), \{P(\mathbb{A}(i))\}_{i=0}^{\infty}, \{P(\mathbb{L}(i))\}_{i=1}^{x}$ as the probability of each ONU state when the network enters into its steady state. Then, these steady state probabilities can be obtained by solving the steady state transition equations.

Denote W(A), W(L), and W(S) as the power consumption when an ONU is in active, listening, and sleep states, respectively. Then, since the time duration of these states are 1 cycle, x cycles, and y cycles, respectively, the energy consumption in these three states are W(A), x*W(L), and y*W(S), respectively. The average energy consumption equals to $$W(\mathbb{A}) \cdot \sum_{i=0}^{\infty} P(\mathbb{A}(i)) + x \cdot W(\mathbb{L}) \cdot \sum_{i=1}^{x} P(\mathbb{L}(i)) + y \cdot W(\mathbb{S}) \cdot P(\mathbb{S})$$

Denote E[dl|S], E[dl|L], and E[dl|A] as the conditional expectation of the delay for the packets which arrive when an ONU is sleeping, listening, and active, respectively. Then, the average delay equals to $$E[dl \mid \mathbb{S}] \cdot P(\mathbb{S}) + E[dl \mid \mathbb{L}] \cdot \sum_{i=1}^{\infty} P(\mathbb{L}(i)) + E[dl \mid \mathbb{A}] \cdot \sum_{i=0}^{\infty} P(\mathbb{A}(i))$$

For packets which arrive when an ONU is sleeping, they have to wait until an ONU wakes up from the sleep status before being transmitted. The average waiting time equals to y=2 cycles since the sleep time duration equals to y cycles. We refer this delay to as "wait-to-wakeup" delay. In addition, a packet has to wait until the completion of the transmission of all other packets arrived prior to its arrival. For the jth packet arriving when an ONU is sleeping, it has to wait for the transmission of all the first j−1 packets. Since on average each packet takes μ time to be transmitted, the average waiting time for the jth packet equals to (j−1)·μ+y/2*2 ms.

For the case that there are k arrival packets when an ONU is sleep, the average delay of these k packets equals to $\Sigma_{j=1}^{k}(j-1)\cdot \mu + y/2 \cdot 2 \text{ ms}/k = (k-1)\cdot \mu + y/2$ The above delay is referred to as "queuing delay". Applicants can further derive the conditional expectation of the delay for packets which arrive when an ONU is sleeping.

$$E[dl \mid \mathbb{S}] = y/2 \cdot 2ms + \sum_{i=1}^{\infty} [p^a(i, y)(i-1) \cdot \mu]$$

For packets which arrive when an ONU is in the active status or listening status, they do not need to wait until an ONU wakes up, and thus do not experience "wait-to-wakeup" delay. Considering the queueing delay, we can derive that the average waiting time for these packets are $$E[dl|\mathbb{L}] = \sum_{i=1}^{\infty} [p^a(i,x)(i-1)\cdot\mu],$$

$$E[dl|\mathbb{A}] = \sum_{i=1}^{\infty} [p^a(i,z)(i-1)\cdot\mu]$$

Note that, packets which arrive when an ONU is asleep have to wait on average additional y/2*2 ms "wait-to-wakeup" time as compared to those which arrive when an ONU is listening or active.

Figure 5:
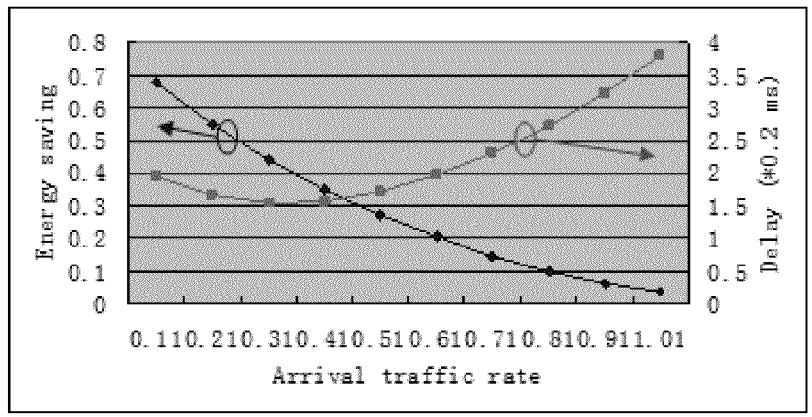
FIGS. 5(a)-(c) show graphs of comparative energy savings and delay with the inventive method.
Figure 5:
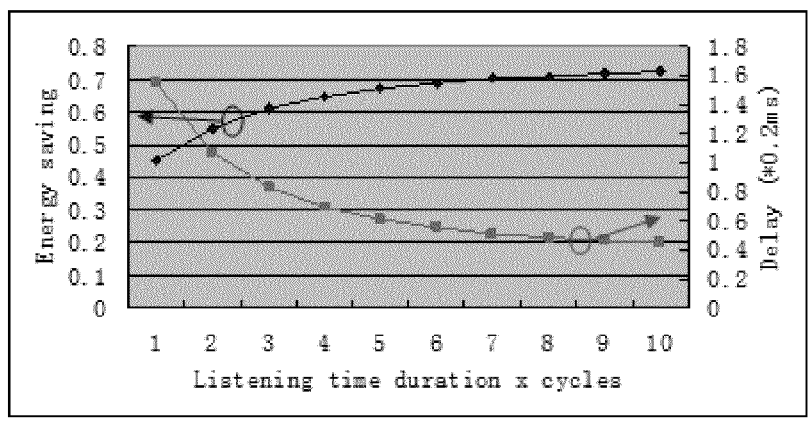
Figure 5:
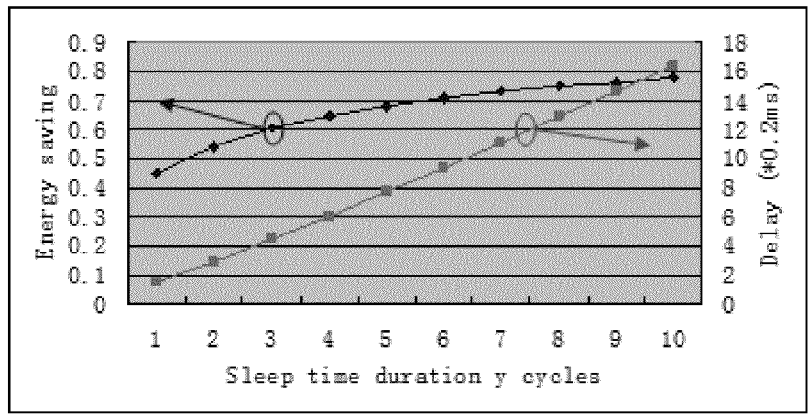

For comparative energy savings comparisons, consumptions of the ONU in active status, listening status, and sleep status have been set as 750 mW, 170 mW, and 50 mW, respectively. FIG. 5(a) illustrates the energy saving performances under different traffic arrival rates. It is assumed that on average one packet from the ONU is scheduled in each traffic scheduling cycle, i.e., μ=1. The average traffic arrival rate λ is changed from 0.01 to 1.01. With the increase of the arrival traffic rate, both the sleep state probability and listening state probability decrease, and thus the energy saving decreases. When the arrival rate equals to 11% of the departure rate, the energy saving is as large as 70%.

Regarding delay performances, when the traffic rate is small, the queuing delay is small, and the average delay is dominated by the "wait-to-wakeup" time. When the traffic rate increases beyond some certain value, the probability that an ONU stays in sleep status is small, and the "wait-to-wakeup" time takes a small portion of the overall average delay. Thus, the average delay is dominated by the queuing delay when the traffic rate is large enough. FIG. 5(a) shows that delay first decreases with the increase of the traffic rate. This is because that the overall average delay is dominated by the "wait-to-wakeup" time in this case. With the increase of the traffic rate, the sleep state probability decreases, and the "wait-to-wakeup" time decreases, which therefore results in the decrease of the average delay. FIG. 5(a) also shows that delay increases when the traffic rate increases beyond some point. In this case, delay is dominated by the queueing delay. With the increase of the traffic rate, the queueing delay increases, and thus the average delay increases.

FIG. 5(b) illustrates the impact of the listening time duration x on the energy saving and delay. With the increase of the listening cycles x, the probability that an ONU stays in the listening state increases, and the probability that an ONU stays in the sleep state decreases. The decreasing of the sleep state probability results in the increase of the active state probability since a smaller number of packets are backlogged and the time duration required to transmit these packets is smaller. Then, the overall probabilities that an ONU stays in listening and sleep states increases. Therefore, the energy saving increases with the increase of x for this particular setting of the power consumptions of sleep and listening states. For delay performances, delay decreases with the increase of the listening time owing to the decrease of the sleep state probability. As stated before, because of the "wait-to-wakeup" time, packets experience longer delay if they arrive when an ONU stays in sleep status as compared to those arrive when an ONU stays in active and listening status. Thus, the decrease of the sleep state probability results in the decrease of the average packet delay.

FIG. 5(c) shows the impact of the number of sleeping cycles y on the energy saving and delay performances. With the increase of the number of sleeping cycles y, the energy saving increases since the energy consumption in the sleep status is the smallest among all three sets of states. On the other hand, with the increase of y, the probability that an ONU stays in the sleep status decreases. Thus, the increasing speed of the energy saving is slower than that of the sleep time duration. Regarding delay performances, delay increases with the increase of the sleep time since longer "wait-to-wakeup" time will be incurred with larger sleeping time. The delay almost increases linearly with the increase of the sleep time because the "wait-to-wakeup" time increases linearly with the number of sleeping cycles y.

From the foregoing it can be appreciated that, compared to existing schemes, the inventive method possesses two main advantages. First, it can efficiently put ONUs into sleep without extending the EPON MAC protocol. Also, since it does not require handshaking between OLT and ONUs, the inventive method can achieve high energy saving efficiency. Second, the inventive method allows dynamic bandwidth allocation among ONUs. Consequently, it achieves large bandwidth utilization.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for controlling downstream scheduling in an Ethernet passive optical network EPON, said method comprising the steps of:
   i) setting downstream traffic scheduling rules at an optical line terminal OLT for a plurality of ONUs, comprising:
      defining a time duration of 2 ms as a downstream traffic scheduling cycle;
      in a scheduling cycle, allocating each ONU with some time duration if it has downstream traffic, wherein ONUs need not be allocated with continuous time durations within a scheduling cycle; and
      if said OLT infers that an ONU is sleeping, said OLT queuing the arrival of downstream traffic of the ONU until said ONU wakes up;
   ii) transmitting said rules to optical network units ONUs, each ONU owning information of the downstream traffic scheduling rules, such that the ONU infers its current downstream queue status based on historical arrival downstream traffic;
   iii) according to the inferred queue status, said ONUs making their own sleep decisions based on selective sleep control rules, said sleep control rules, being implemented at said ONUs, being known by said OLT; and
   iv) based on said sleep control rules, said OLT inferring a status of said ONUs, and buffering incoming downstream traffic of sleeping ONUs responsively.

2. The method of claim 1, wherein said steps i)-iv) cooperatively enable efficiently putting said ONUs into sleep without extending an EPON MAC protocol and not requiring handshaking between said OLT and ONUs.

3. The method of claim 1, wherein the downstream traffic inference at said ONU in step iii) comprises that if an ONU failed to receive any downstream data traffic within an EPON traffic scheduling cycle, said ONU infers that its downstream queue is empty, whereby, rather than being explicitly notified by OLT about its downstream queue status, said ONU infers its downstream queue status simply by monitoring the downstream bandwidth allocated among ONUs.

4. The method of claim 1, wherein said sleep control rules comprise that if an ONU does not receive downstream data traffic for x traffic scheduling cycles, said ONU switches into a sleep state and sleeps for y traffic scheduling cycles, said x traffic scheduling cycles being listening cycles, and y traffic scheduling cycles being sleeping cycles, said x and y being known to said OLT such that said OLT can infer a sleep status of said ONUs.

5. The method of claim 1, wherein said step iv) comprises that to avoid missing said downstream traffic when an ONU is sleeping, said OLT infers the sleep status of said ONU, and then buffer its incoming downstream traffic until said ONU wakes up, to enable the ONU status be inferred by said OLT, said OLT owning information of the sleep control procedure implemented at each ONU.

6. The method of claim 1, wherein said step iv) comprises:
if said OLT does not allocate any time slots to an ONU for x traffic scheduling cycles, said ONU will enter into sleep status in the next predetermined number of traffic scheduling cycles; and
after an OLT infers that an ONU is sleeping, it buffers the arrival downstream traffic of this ONU until the ONU wakes up from sleep.

* * * * *